United States Patent Office 2,757,977
Patented Aug. 7, 1956

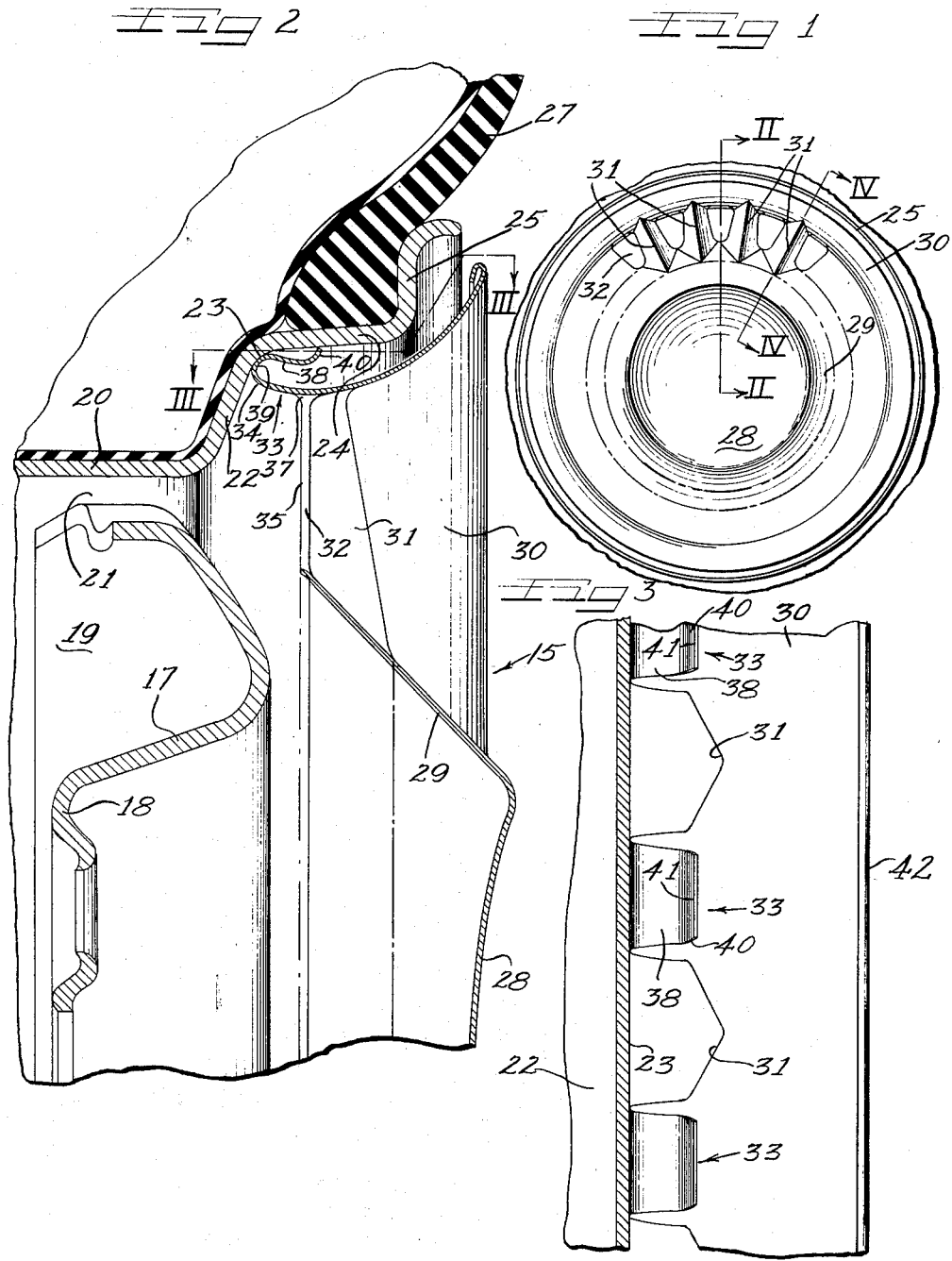

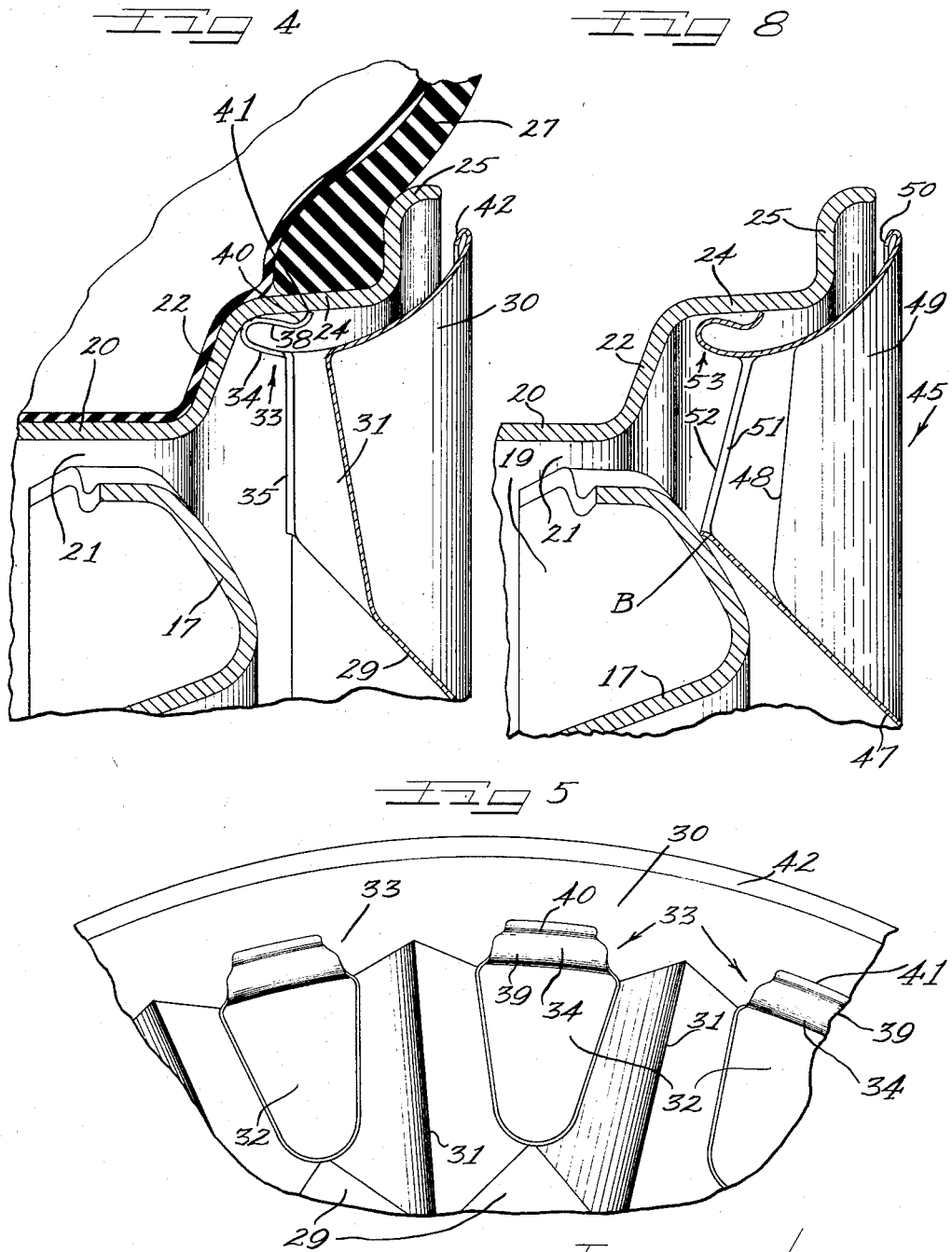

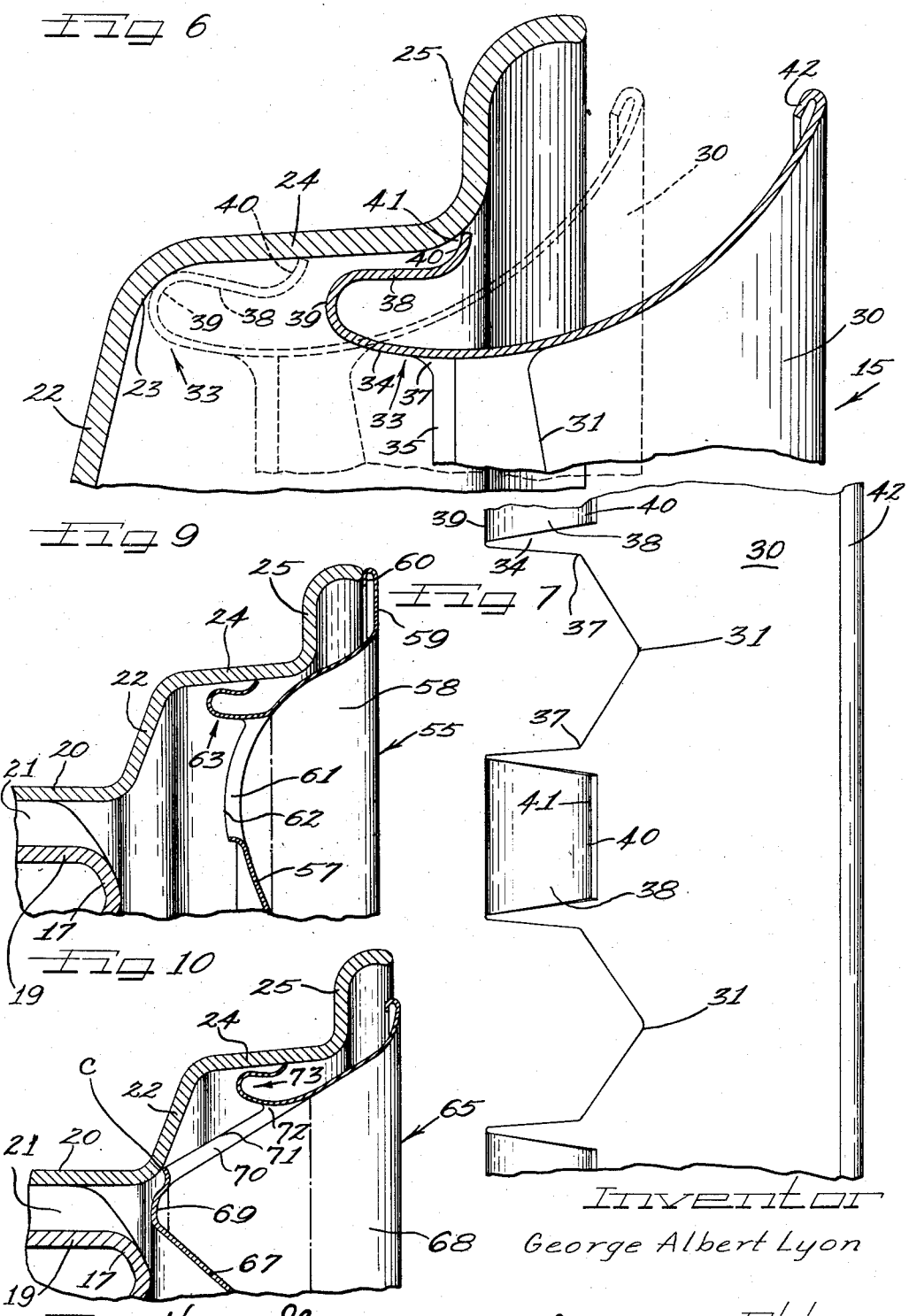

2,757,977
WHEEL COVER

George Albert Lyon, Detroit, Mich.

Application August 11, 1953, Serial No. 373,539

13 Claims. (Cl. 301—37)

The present invention relates to improvements in wheel structures and more particularly concerns the ornamental and protective covering of the outer sides of vehicle wheels.

An important object of the present invention is to provide an improved wheel structure wherein novel cover means has improved retaining spring finger structure.

Another object of the invention is to provide a novel wheel cover that has a unique retaining finger structure engageable in press-on pry-off relation with a flange of a wheel to which the cover may be applied.

A further object of the invention is to provide novel retaining spring finger structure for wheel covers of the self-retaining type.

Still another object of the invention is to provide in a sheet metal wheel cover construction novel self-retaining finger structure which is slidable into retaining engagement with a vehicle wheel flange and is slidably disengageable from the flange upon pry-off force being applied to the cover, but which will retain its cover retaining efficiency despite repeated pry-off actions.

Other objects, features and advantages of the present invention will be readily apparent from the following detailed description of certain preferred embodiments thereof taken in conjunction with the accompanying drawings in which:

Figure 1 is a side elevational view of a wheel structure embodying the present invention;

Figure 2 is an enlarged fragmentary radial sectional view taken substantially on the line II—II of Figure 1;

Figure 3 is a fragmentary sectional detail view taken substantially on the line III—III of Figure 2;

Figure 4 is a fragmentary radial sectional view taken substantially on the line IV—IV of Figure 1;

Figure 5 is a fragmentary rear elevational view of the cover of Figures 1 to 4;

Figure 6 is an enlarged fragmentary radial sectional view similar to Figure 2 but showing the cover in process of being applied to the wheel;

Figure 7 is an enlarged fragmentary peripheral elevational view of the cover;

Figure 8 is a fragmentary vertical sectional view through a wheel and cover assembly showing a modification;

Figure 9 is a fragmentary radial sectional view through a wheel and cover assembly showing another modification; and Figure 10 is a fragmentary radial sectional view through a wheel and cover assembly showing still another modification.

As shown on the drawings:

A wheel cover 15 embodying features of the invention is adapted to be applied to the outer side of a vehicle wheel comprising a disk spider wheel body 17 having a dished central bolt-on flange 18 and an outer marginal generally axially directed flange 19 attached in suitable manner to a tire rim base flange 20. At suitable intervals such as three to five, the attachment flange 19 of the wheel body is inset to provide appropriate air circulation openings 21.

The tire rim has extending generally radially outwardly and sloping axially outwardly from the outer side of the base flange 20, a side flange 22. Joined to the radially outer side of the side flange 22, along a curve or groove 23, is an intermediate generally axially outwardly but slightly radially outwardly sloping flange 24 which merges with a radially outwardly and axially outwardly directed terminal flange 25. The tire rim is of a conventional multi-flange drop center type adapted to support a pneumatic tire and tube assembly 27.

According to the present invention, the cover 15 is made as a stamping from suitable sheet metal such as stainless steel or other resilient sheet, with all portions of the cover made from a single piece of the material. To this end, the cover comprises a central generally axially outwardly bulged hub or crown portion 28 having a generally radially outwardly and axially inwardly sloping side wall 29. Confronting cover portion 29 is an annular outer marginal divergent cover portion 30. This outer marginal ring-like portion 30 of the cover is of preferably concave convex shape and slopes generally radially and axially inwardly which is joined integrally in one piece with the inner margin of the central crown side wall 29 by means of an annular series of spaced radially extending embossed ribs 31. These reinforcing ribs merge at their respectively inner and outer ends with the inner cover portion 29 and the outer cover portion 30 and cooperate therewith to afford a substantially rigid structure. In the first form, it will be observed each of the ribs are formed as generally inverted V-shaped cross-section spoke-like elements with oppositely sloping sides terminating in a radially extending peak.

The central crown portion 28 of the cover is adapted to overlie the wheel body 17 while the outer annular marginal portion 30 of the cover is adapted to substantially overlie the tire rim, while the spoke-like ribs 31 in the annular depression between the divergent cover portions 29 and 30 overlie the wheel openings 21.

In order to enhance the illusion of the ribs 31 being spokes, the areas between the spokes are struck out to provide apertures 32. The apertures 32 also enable circulation of air through the cover and through the wheel openings 21.

For retaining the cover 15 on the wheel, the cover is provided with a series of spring retaining fingers 33 which are formed integrally in one piece with the cover and economically and efficiently comprise and are formed from the material which is struck out in forming the cover openings 32. To this end, each of the retaining fingers 33 comprises a gooseneck having a body leg 34 which tapers from integral connection in one piece with the inner margin of the outer marginal annular portion 30 of the cover at the outer edge of an opening 32 and adjacent outer ends of the adjoining ribs 31 which flank the finger. In a preferred form, as best seen in Figures 2 and 4, the body leg portions 34 of the fingers extend as continuations of the curvature of the annular outer marginal portion 30 and which is substantially rigid in the area of juncture of the retaining fingers therewith by reason of the bracing effect of the spoke-like reinforcing ribs 31.

To enhance the resiliency of the finger leg portions 34, they are not only formed arcuately in axial direction, but they are also formed arcuately and thereby stiffened in transverse direction as best seen in Figure 5.

In addition, reinforcement or bracing, enhancing the resilience of the finger legs 34 is afforded by respective axially inwardly directed reinforcing flanges 35 defining the openings 32 and having their radially outer ends merging with the respective sides of the contiguous finger leg as shown at 37 (Figures 2, 4 and 5).

Each of the gooseneck fingers 33 has a return bent resiliently flexible attachment leg 38 joined to the axially inner end of the body leg 34 by means of a small radius, reinforcing rib-like juncture bend or shoulder portion 39. The flexible finger leg 38 extends generally axially outwardly in radially outwardly spaced opposed relation to the associated finger body leg 34 and is provided with a short, stiff generally radially outwardly and slightly axially outwardly directed retaining terminal flange 40 having a tip retainingly engageable with the inner face of the intermediate flange 24. The tip of the retaining terminal flange 40 has at the axially inner side thereof a relatively sharp edge 41 adapted to enter into substantially gripping retaining engagement with the face of the terminal flange.

It will be observed that the substantially gooseneck or U-shaped retaining fingers 33 extend only a relatively short distance axially inwardly beyond the adjacent portion of the cover at juncture of the outer annular portion with the ribs 31, and that the return bent spring finger portions 38 extend opposite the juncture of the leg portions 34 with the cover, with the retaining terminals 40 generally opposite the junctures of the retaining fingers with the cover or slightly axially outwardly beyond such juncture. Therefore, radially inward thrust against the retaining terminals 40 finds substantial resistance against radially inward deflection of the retaining fingers 33, with the spring legs 38 thereof, of course, being substantially more resiliently flexible than the finger back or body legs 34. By reason of the tapered structure of the retaining fingers as best seen in Figures 3 and 4, this resiliency differential is enhanced.

Further improvement in the resiliency resistance to radially inward deflection of the retaining fingers 33 is attained by the generally radially outward angling of the retaining finger axially inward legs 34 toward general convergence with the axial plane of the intermediate flange 24. This feature is clearly evident in Figures 2 and 6.

The construction and relationship of the retaining fingers 33 to the remainder of the cover and to the wheel is such that in the unassembled condition of the cover, the retaining terminal flanges 40 of the spring clip fingers extend to a diameter slightly greater than the inside diameter of the intermediate flange 24, as best seen in Figure 6. Hence, in applying the cover to the wheel, it is generally centered with respect to the outer side of the wheel and with the tips of the terminal flanges 40 engaging the shoulder between the intermediate flange 24 and the terminal flange 25 of the tire rim. Thus the cover will be substantially centered before it is pressed home on the wheel (Figure 6).

As axially inward pressure against the cover 15 presses the same axially inwardly onto the wheel, the retaining edges 41 of the retaining fingers cam axially inwardly along the gradually inwardly tapering slope of the inner face of the intermediate flange 24 and the spring legs 38 of the retaining fingers are progressively tensioned as they are deflected radially inwardly, until the shoulders 39 bottom into the juncture groove 23 between the side and intermediate flanges of the tire rim. The final assembled position of the cover is shown in dash outline in Figure 6 and in full outline in Figures 2 and 4. The bottomed condition of the fingers 33 is also shown in Figure 3.

It will be observed that as the cover is pressed axially inwardly and the retaining finger resilient legs 38 are resiliently deflected radially inwardly, major deflection occurs toward the tip or distal ends of the legs 38, fulcruming about the curvature of the small radius juncture shoulders 39. Thereby, a resilient windup action occurs which develops substantial resilient thrust working radially outwardly through the retaining terminals 40 and more particularly the retaining edges 41 at the tips of the terminal flanges. Moreover, during the inward flexure of the clip legs 38, the tips of the terminal flanges 40 are gradually tilted inwardly so that the edges 41 gradually increase their biting purchase upon the inner surface of the intermediate flange 24 until maximum biting retaining purchase or engagement is attained when the cover is fully mounted on the wheel.

It will be observed that when the cover is fully on the wheel as determined by the stop shoulders 39 engaging the tire rim, all portions of the cover except the retaining fingers are held in spaced, substantially floating relation to the wheel, with the outer marginal portion 30 of the cover spaced from the tire rim and thus enabling free circulation of air through the space between it and the tire rim and also enabling the ready escape of gravel or other foreign matter that may enter between the cover and the tire rim.

By reason of the strong outward retaining thrust of the retaining edges 41 of the fingers against the intermediate flange of the tire rim, ordinary forces tending to dislodge the cover are strongly resisted. However, upon the application of a pry-off force by means of a pry-off tool such as a screw driver (not shown) or the like applied behind the rigid outer marginal cover portion 30, which for this purpose among others, has the outer extremity provided with an underturned reinforcing and finishing flange 42, will be effective to dislodge the cover from the wheel. This is accomplished by levering the pry-off force at a selected point under the outer marginal portion 30, and this causes not only an axially outward pry-off force but also a radially inward force which effects slight radial displacement of the cover as enabled by the resilient fingers at the opposite side of the cover from the point of pry-off leverage, while at the same time the retaining fingers adjacent the point of pry-off leverage tend to spring open and thus reduce the angle of convergence between the tips of the retaining terminals 40 and the intermediate flange. As the pry-off leverage progresses, the retaining finger tips adjacent the point of pry-off leverage tend to rock toward abutment with the intermediate flange and thus release the respective edges 41 from biting engagement with the intermediate flange so that the finger tips can slide outwardly along the intermediate flange. In other words, the terminals 40 do not turn out of engagement with the intermediate flange, since this is prevented by the short leverage distance between the inner and outer legs 34 and 38 of the fingers and the closeness of the outer legs 38 to the intermediate flange 24 and more especially the generally axially outward and radially inward slope of the legs 38, but the retaining terminals 40 will slide out of the retaining engagement under the pry-off force.

In the modification of Figure 8, the wheel is substantially the same as in Figure 2 and therefore the same reference numerals have been applied thereto. In the modification 45 of Figure 8, the cover is constructed much the same as the cover 15, having a central crown portion 47 the side wall of which slopes toward a series of spoke-like reinforcing ribs 48 by which is connected thereto an annular outer concave convex generally radially and axially inwardly sloping marginal divergent portion 49 which has an underturned outer peripheral reinforcing flange 50. Intermediate the spoke-like ribs 48, a series of openings 51 are provided defined by axially inwardly directed reinforcing flanges 52. The inner edges of the ribs 48 slope generally radially and axially inwardly so that the inner ends of the flanges 51 bottom against the adjacent portion of the wheel body 17 radially inwardly from the wheel openings 21 at B.

Retention of the cover 45 on the wheel is effected through the medium of retaining spring fingers 53 which in all essential respects and function are the same as the retaining fingers 33 hereinbefore described. However, instead of the rounded juncture shoulders at the inner portions of the fingers 53 bottoming against the tire rim, they are held out of such bottoming relation by reason of the cover bottoming against the wheel body 17 as shown at B.

In the modification of Figure 9, the wheel is substantially the same as the wheel of Figure 2 and similar reference numerals indicate similar parts. In this modification, a cover 55 is applied to the outer side of the wheel which in general respects may be the same as the covers 15 and 45. However, the cover 55 is provided with an intermediate dished portion 57 joining an outer marginal annular divergent portion 58 that has a generally radially outwardly directed outer terminal portion 59 provided with an underturned reinforcing and finishing flange 60 which is adapted to bottom against the tip of the terminal flange 55 of the wheel when the cover is fully in place on the wheel.

The cover 55 has at appropriate intervals in the intermediate portion 57 openings 61 defined by axially inwardly directed reinforcing flanges 62 providing back up for retaining fingers 63 derived from the material struck out in making the openings 61 and providing general extensions from the inner portion of the outer annular portion 58 of the cover. The fingers 63 have substantially the same structure and functional characteristics as the retaining fingers 33 hereinbefore described and therefore the description will not be herein repeated but the description of the fingers 33 is applicable to the fingers 63.

In the modification of Figure 10, a cover 65 is applied to the outer side of a wheel which is much the same as the other wheel identified herein and similar reference numerals have therefore been applied. The cover comprises an inner cover portion 67 joining a generally radially outwardly and axially outwardly sloping outer divergent marginal portion 68 on a deeply indented annular intermediate portion 69 which enters close to the juncture between the tire rim and the wheel body. At the inner portion of the marginal portion 68 of the cover, a series of openings 70 are provided having inturned respective flanges 71 reinforcing the same and joining at 72 with respective retaining fingers 73 which in structure and function are substantially the same as the retaining fingers 33 and therefore specific description of the structure and operation of the several features of the finger 73 will be dispensed with since the description of the fingers 33 substantially applies to the fingers 73. However, the fingers 73 do not bottom against the side flange or juncture between the side flange and the intermediate flange, but the inner end portions of the reinforcing flanges 71 engage at C against the side flange 22 adjacent juncture thereof with the base flange 20, thereby defining the axially inward limit of disposition of the cover on the wheel in assembly.

It will be understood that modifications and variations may be effected without departing from the scope of the novel concepts of the present invention.

I claim as my invention:

1. In a wheel structure including a wheel body and a multi-flange tire rim including an intermediate generally radially and axially outwardly sloping flange, a cover for disposition at the outer side of the wheel comprising a body portion for overlying the wheel body and an outer circular portion for overlying the tire rim, a series of openings in said cover at the inner side of said outer annular portion, with material derived from said openings comprising generally U-shaped retaining spring fingers having axially inwardly directed body leg portions extending as general extensions from said outer annular cover portion and return bent generally axially outwardly extending flexible leg portions of substantial length spaced radially outwardly from said body leg portions and having short and stiff angular generally radially and axially outwardly directed retaining terminals with edges engageable in press-on pry-off slidable relation with the intermediate flange of the tire rim, said edges thrusting radially outwardly with retaining grip against said flange under resilient tension of said legs.

2. A wheel structure as defined in claim 1 wherein the tire rim has a side flange joining the intermediate flange and the spring fingers have shoulders at juncture of the legs thereof engaging adjacent juncture of the side flange and terminal flange and thereby defining the axially inward limit of the cover.

3. A wheel structure as defined in claim 1 wherein the openings in the cover are defined by inwardly directed reinforcing flanges and such reinforcing flanges engage against a generally axially outwardly facing flange of the tire rim and thereby determine axially inward limit of movement of the cover onto the wheel.

4. In a wheel structure including a wheel body and a multi-flange tire rim including a side flange facing generally axially outwardly and merging at the radially outer side thereof with an intermediate generally radially and axially outwardly sloping flange, a cover for disposition at the outer side of the wheel including a circular body portion for overlying the tire rim and the wheel body, and a series of circumferentially spaced cover retaining resilient fingers carried by and disposed behind the cover body for retaining engagement with the tire rim, said fingers having generally axially inwardly extending leg portions directed generally toward the side flange of the tire rim and joining return bent generally axially outwardly extending and radially outwardly spaced resilient leg portions on a short radius juncture, said finger portions being flexible radially toward and away from said leg portion and having relatively short distal terminal extremities thereof turned angularly from the finger portions generally radially and axially obliquely outwardly and defined by retaining edge corners on the axially inner sides of the distal extremities thereof for retaining gripping generally biting engagement with respective axially substantially straight portions of the intermediate flange of the tire rim, said finger terminal extremity corners normally extending to a greater diameter than said intermediate flange and being arranged to cam thereon upon assembly of the cover with the wheel to flex the fingers radially inwardly and thereby tilt the finger terminal flanges inwardly and increase the biting purchase of the edge corners with said portions of the intermediate flange, said edge corners being releasable from the intermediate flange upon application of pry-off tool leverage to the radially outer marginal portion of the cover to effect slight radial displacement of the cover as enabled by the resilient fingers at the opposite side of the cover from the point of pry-off leverage so that the retaining fingers adjacent the point of pry-off leverage tend to spring open and thus reduce the angle of convergence between the tips of the finger terminal flanges and said portions of the intermediate flange to thereby reduce the biting engagement of said biting corners for axially outward sliding disengagement from said portions of the intermediate flange.

5. A wheel structure as defined in claim 4 wherein the short radius juncture portions of the fingers between the leg and finger portions thereof bottom against the side flange of the tire rim for supporting the cover in substantially floating relation to the wheel.

6. In a wheel structure including a tire rim having a side flange facing generally axially outwardly and an intermediate flange projecting generally axially and radially outwardly therefrom and facing radially inwardly, a cover for disposition at the outer side of the wheel including a portion to lie in substantially concentric radially inwardly spaced relation from said intermediate flange and having thereon a series of circumferentially spaced resilient retaining fingers extending generally radially therefrom and having generally return bent generally axially outwardly extending retaining finger legs spaced radially outwardly from said cover portion and spaced radially inwardly from the intermediate flange and radially resiliently deflectable relative to both the cover and the intermediate flange, said legs having short and stiff radially and axially outwardly angled retaining terminals engageable at their tips in retaining gripping press-on, pry-off relation with said intermediate flange, the terminal tips normally lying to a greater diameter than the diameter of the engageable portion of the intermediate flange and thereby being radially inwardly deflected by the retaining engagement with the intermediate flange and thus placing said legs under resilient radially inwardly deflected tension, said cover portion and said retaining fingers being disposed in assembly in confronting relation to the side flange of the tire rim, the junctures of said finger legs with said cover portion being of such short radius and short leverage distance as to preclude turning of said retaining terminals out of engagement with the intermediate flange but compelling sliding of the terminals out of the retaining engagement in response to pry-off force applied to the cover.

7. A wheel structure as defined in claim 6 wherein said short radius juncture bottoms against the tire rim side flange and thereby maintains the cover in spaced relation to the wheel.

8. A wheel structure as defined in claim 6 wherein the cover has a portion thereof spaced radially from said retaining fingers and engageable with the wheel to limit the axially inward disposition of the retaining fingers to a spaced relation at said junctures with respect to said side flange.

9. In a wheel structure including a tire rim having a side flange facing generally axially outwardly and an intermediate flange projecting generally axially and radially outwardly therefrom and facing radially inwardly, a cover for disposition at the outer side of the wheel including a portion to lie in substantially concentric radially inwardly spaced relation from said intermediate flange and having at the inner side thereof alternating radially inwardly extending spokes and a series of circumferentially spaced resilient retaining fingers having legs derived from material between the spokes and extending generally axially inwardly and then turned generally radially outwardly to provide generally return bent generally axially outwardly extending retaining finger legs spaced radially outwardly from said cover portion and spaced radially inwardly from the intermediate flange and radially resiliently deflectable relative to both the cover and the intermediate flange, said legs having short and stiff radially and axially outwardly angled retaining terminals engageable at their tips in retaining gripping press-on, pry-off relation with said intermediate flange, the terminal tips normally lying to a greater diameter than the diameter of the engageable portion of the intermediate flange and thereby being radially inwardly deflected by the retaining engagement with the intermediate flange and thus placing said legs under resilient radially inwardly deflected tension, said cover portion and said retaining fingers being disposed in assembly in confronting relation to the side flange of the tire rim.

10. In a wheel structure including a tire rim having a side flange facing generally axially outwardly and an intermediate flange projecting generally axially and radially outwardly therefrom and facing radially inwardly, a cover for disposition at the outer side of the wheel including a portion for overlying the tire rim and extending generally axially inwardly into substantially concentric radially inwardly spaced relation from said intermediate flange and being at its radially and axially inner edge subdivided into a circumferentially spaced series of resilient retaining fingers and generally radially inwardly extending spokes, with both the spokes and the fingers derived integrally from a common piece of material with the cover, said retaining finger being of generally U-shape with axially inwardly extending portions and return bent respective loops providing generally radially outwardly and then axially outwardly extending finger legs projecting into the space between said cover and the intermediate flange and being radially spaced from both and radially resiliently deflectable, said legs having short and stiff radially and axially outwardly angled retaining terminals engageable at their tips in retaining gripping press-on pry-off relation with said intermediate flange, the terminal tips normally lying to a greater diameter than the diameter of the engageable portion of the intermediate flange and thereby being radially inwardly deflected by the retaining engagement with the intermediate flange and thus placing said legs under resilient radially inwardly deflected tension, said finger loops being engageable with the side flange of the tire rim for defining the axially inward disposition of the cover with said spokes projecting generally radially inwardly beyond the tire rim for overlying a wheel body attached to the tire rim.

11. In a cover for disposition at the outer side of a vehicle wheel, a sheet metal cover body having an outer annular substantially rigid portion, an inner annular substantially rigid portion and an intermediate portion, said intermediate portion having a series of generally radially extending apertures therein, with retaining fingers provided by material struck from said apertures, said retaining fingers being disposed behind the cover, and the material intermediate the apertures comprising generally radially extending and transversely angularly shaped substantially rigid rib-like spokes with the end portions thereof adjacent the fingers merging a substantial distance beyond the fingers rigidly into the rigid annular portion of the cover nearest the fingers.

12. In a wheel structure including a tire rim and a wheel body with wheel openings enabling circulation of air through the wheel adjacent the tire rim and wherein the tire rim has a generally radially inwardly facing annular intermediate flange spaced substantially radially outwardly from the wheel openings and merging with a terminal flange, a trim member for overlying the tire rim inclusive of said terminal and intermediate flanges and extending generally radially inwardly to overlie the wheel body to a substantial extent radially inwardly beyond the wheel openings, the trim member having radially inner and outer continuous substantially circular and rigid portions and an intermediate portion subdivided into a series of elongated generally radially extending rib-like spokes connecting said annular trim member portions and providing therebetween alternating radially elongated openings arranged to be generally opposite the wheel openings for air circulation therethrough and the wheel openings, material struck from the openings at the radially outer ends thereof being formed axially inwardly of the cover into cover-retaining fingers retainingly engageable in press-on, pry-off relation with the intermediate flange of the tire rim.

13. In a wheel structure including a tire rim having a side flange facing generally axially outwardly and an intermediate flange projecting generally axially and radially outwardly therefrom and facing radially inwardly, a cover for disposition at the outer side of the wheel including a portion to lie in substantially concentric radially inwardly spaced relation from said intermediate flange and having thereon a series of circumferentially spaced resilient generally U-shaped retaining fingers extending generally radially therefrom and having generally axially extending and radially outwardly angled radially inner legs and generally return bent generally axially outwardly extending retaining finger legs spaced radially outwardly from said cover portion and spaced radially inwardly from the intermediate flange and radially resiliently deflectable relative to both the cover and the intermediate flange, said return bent legs having short and stiff radially and axially outwardly angled retaining terminals engageable at their tips in retaining gripping press-on, pry-off relation with said intermediate flange, the terminal tips normally lying to a greater diameter than the diameter of the engageable portion of the intermediate flange and thereby being radially inwardly deflected by the retaining engagement with the intermediate flange and thus placing said legs under resilient radially inwardly deflected tension, said cover portion and said retaining fingers being disposed in assembly in confronting relation to the side flange of the tire rim, the junctures of said finger legs with one another and the relationship of said radially inner legs with said cover portion being of such short radius and short leverage distance as to preclude turning of said retaining terminals out of engagement with the intermediate flange but compelling sliding of the terminals out of the retaining engagement in response to pry-off force applied to the cover.

References Cited in the file of this patent

UNITED STATES PATENTS

| | | |
|---|---|---|
| Re. 22,428 | Lyon | Feb. 1, 1944 |
| D. 167,271 | McLeod | July 15, 1952 |
| 2,094,326 | Lyon | Sept. 28, 1937 |
| 2,368,228 | Lyon | Jan. 30, 1945 |
| 2,368,238 | Lyon | Jan. 30, 1945 |
| 2,574,491 | Lyon | Nov. 13, 1951 |

FOREIGN PATENTS

| | | |
|---|---|---|
| 449,040 | Great Britain | June 19, 1936 |